United States Patent
Christensson

(10) Patent No.: US 11,493,417 B2
(45) Date of Patent: Nov. 8, 2022

(54) METHOD FOR DETERMINING A MEASUREMENT ERROR CAUSED BY A FILLING ERROR

(71) Applicant: eralytics GmbH, Vienna (AT)

(72) Inventor: Niklas Christensson, Vienna (AT)

(73) Assignee: ERALYTICS GMBH, Vienna (AT)

( * ) Notice: Subject to any disclaimer, the term of this patent is extended or adjusted under 35 U.S.C. 154(b) by 219 days.

(21) Appl. No.: 17/016,966

(22) Filed: Sep. 10, 2020

(65) Prior Publication Data

US 2021/0072129 A1 Mar. 11, 2021

(30) Foreign Application Priority Data

Sep. 10, 2019 (AT) ............... A 50788/2019

(51) Int. Cl.
*G01N 9/34* (2006.01)
*G01N 29/036* (2006.01)
*G01F 23/14* (2006.01)

(52) U.S. Cl.
CPC ............ *G01N 9/34* (2013.01); *G01F 23/14* (2013.01); *G01N 29/036* (2013.01)

(58) Field of Classification Search
CPC ......... G01N 9/34; G01N 29/036; G01F 23/14
See application file for complete search history.

(56) References Cited

U.S. PATENT DOCUMENTS

| | | | | |
|---|---|---|---|---|
| 3,983,744 A | * | 10/1976 | Agar | G01N 9/002 73/32 A |
| 6,065,335 A | * | 5/2000 | Denz | G01F 22/02 73/299 |
| 6,718,832 B1 | * | 4/2004 | Hay, Jr. | G01G 19/00 73/790 |
| 7,945,395 B2 | | 5/2011 | Heimel et al. | |

FOREIGN PATENT DOCUMENTS

| | | | | |
|---|---|---|---|---|
| AT | 505937 | | 4/2011 | |
| CN | 113906272 A | * | 1/2022 | ............ G01F 1/74 |

* cited by examiner

*Primary Examiner* — John Fitzgerald
(74) *Attorney, Agent, or Firm* — Workman Nydegger

(57) ABSTRACT

A method for determining a measurement error caused by a filling error, in particular the presence of gas bubbles, during measurement of the density of a liquid by means of a densimeter having a flexural resonator containing the liquid to be measured. During a measuring operation, a period duration of an oscillation of the flexural resonator induced by an induction unit is measured by a measuring device and the density of the liquid is determined by an evaluation unit.

8 Claims, 3 Drawing Sheets

METHOD FOR DETERMINING A MEASUREMENT ERROR CAUSED BY A FILLING ERROR

The present invention relates to a method for determining a measurement error caused by a filling error, in particular the presence of gas bubbles, in particular air bubbles, during the measurement of the density of a liquid by means of a densimeter having a flexural resonator containing the liquid to be measured, wherein during a measuring operation, a period duration of an oscillation of the flexural resonator induced by an induction unit is measured by means of a measuring device and the density of the liquid is determined thereof by means of an evaluation unit.

Density determination of liquids using flexural resonators has been known and widely used for measuring the density of liquids for a long time. A flexural resonator, which may be provided in the form of a U-shaped tube, may be filled with the liquid to be measured and its natural oscillation may be e.g. induced piezoelectrically or magnetically with a natural frequency of the flexural resonator. The liquid contained in the flexural resonator changes its mass compared to an empty flexural resonator and thus the natural frequency of the flexural resonator. Consequently, the density of the liquid may be inferred from the measurement of the natural frequency of the flexural resonator containing the liquid, e.g. by means of a frequency counter, wherein the density of the liquid is indirectly proportional to the square of the measured frequency.

In such density measurements, filling errors such as gas bubbles and in particular air bubbles in the liquid may lead to wrong measurement results. This is in particular disadvantageous since density measurements, in particular those with high requirements regarding measurement accuracy, may require a long time for the measurement, and each faulty measurement during a long measurement time may cause high additional costs. Long measurement times are in particular necessary because the liquid to be measured has to be heated or cooled to a target temperature in the flexural resonator in order to achieve reproducible measurement conditions.

Several types of gas bubble recognitions are known for recognizing such gas bubbles in a liquid and thus avoiding faulty measurements. One possibility to recognize filling errors consists in conducting an optical examination of the flexural resonator during density measurement, wherein the flexural resonator is photographed from above and compared pixel by pixel to a reference photograph. This method is only suitable for transparent liquids and flexural resonators and not for intransparent liquids such as crude oil or fruit juices. In general, optical examination methods for detecting bubbles in a flexural resonator are only suited to a certain degree because at least sections of the flexural resonator may be intransparent, e.g. covered with gold or a different metal. In addition, bendings of the flexural resonator constitutes another hurdle for optical examinations. One possibility to determine filling errors of intransparent liquids and flexural resonators consists in conducting repeated measurements, in which case the flexural resonator is filled several times with the liquid to be measured, the reproducibility of the density measurement is examined, and in case of a correspondingly low degree of reproducibility it is assumed that there are gas bubbles in the liquid. This method also has several disadvantages because not only is repeatedly filling a flexural resonator during the method laborious, but the measuring time required is at least doubled.

Another method for qualitatively determining gas bubbles in liquids is known from document AT 505937 A4. The disclosed method determines the density of a liquid by measuring the frequencies of a basic and a harmonic oscillation as well as by measuring an oscillation damping value in order to determine the presence of gas bubbles in the liquid. In this method, the functional dependency of the frequency differences on the oscillation dampening differences is determined in a bubble-free and inhomogeneity-free sample, and based on this function as well as on a predetermined tolerance range enveloping the function it is determined whether a measured density value is a valid measurement value or whether the measurement is faulty due to the presence of an air bubble, which means that the measurement value is not valid. A disadvantage of this method is that small bubbles homogeneously distributed in the liquid are hard to detect in highly viscous samples because the sample appears to be a homogenous substance in both oscillation modes in this case. All methods mentioned so far are only able to qualitatively determine gas bubbles in a liquid, i.e. it can only be determined whether gas bubbles are present in the liquid or not with a certain predetermined probability. None of the methods is able to provide a quantitative result regarding the magnitude of the measurement error resulting from the presence of the gas bubbles, which is why it has been impossible until now to provide information on which measurement error is present in a density measurement considered valid.

The object of the invention it thus to provide a method that avoids the disadvantages of the state of the art.

This object is achieved by providing a method for determining a measurement error caused by a filling error, in particular the presence of gas bubbles, with the features of claim 1. The method according to the invention is characterized by the following steps:

determining a first pressure-dependent density difference $\Delta\rho(P)$ by subtracting the determined density $\rho$ of the liquid pressurized with a first pressure $P_0$ by means of a pressurizing means during a first measuring operation and of the liquid pressurized with a second pressure P by means of the pressurizing means during a second measuring operation;

determining the measurement error $\rho_{error}$ via the equation $$\Delta\rho(P) = (P - P_0) \cdot \left(\frac{\rho_{error}}{P} + \frac{1}{E}\right),$$

wherein for solving the equation, either a compressibility E depending on the measured liquid is selected or at least one further density difference $\Delta\rho(P)$ is determined by subtracting the determined density $\rho$ of the liquid pressurized with the first pressure $P_0$ by means of the pressurizing means during the first measuring operation and of the liquid pressurized with at least a further pressure P by means of the pressurizing means during at least one second measuring operation.

This leads to the advantage that, in contrast to previous methods for detecting gas bubbles during density measurements of liquids, it is not qualitative filling errors that are detected, which provide no information about the size and amount of gas bubbles as well as the effect of the filling error on the results of the density measurement, but a quantitative filling error detection is conducted, which is based on the measurement error $\rho_{error}$ resulting from the filling error.

Furthermore, the effect of the measurement error $\rho_{error}$ on the measurement can be advantageously taken into account, whether there is a filling error during measurement or not.

The underlying mathematical model for the calculation of the measurement error $\rho_{error}$ describes a compressible liquid that has one or more bubbles of an ideal gas in the interior or on the surface. Measurement error determination may be approximate or accurate. An approximate measurement error determination for estimating the measurement error $\rho_{error}$ is conducted based on the assumption of a compressibility E that is presumed to be known for the liquid to be measured from the density measurement at the first pressure $P_0$ as well as a further pressure P. It is required that the compressibility E of the liquid to be measured is known. The accurate measurement error determination results from a density measurement at the first pressure $P_0$, the second pressure P and at least one further pressure P, wherein the compressibility E is in this case substituted when solving the equation system and thus therefore not have to be determined. Consequently, the accurate measurement error determination may also be conducted with liquids with an unknown compressibility E.

In particular, a first, approximate measurement in a first step can provide an estimation of the measurement error $\rho_{error}$, and later, in a second step, the accurate value of the measurement error $\rho_{error}$ may be determined by measuring at least two further pressures P, wherein the accuracy of a measurement error determination increases further with a higher number of density measurements, wherein the measuring time required for measurement error determination also increases with a higher number of density measurements.

Measurement error determination with a total of three pressure measurements has, in this connection, proven to be a good compromise between good measuring accuracy and practicable measuring time.

According to a preferred embodiment of the method, a filling error is detected when a predetermined threshold value of the measurement error $\rho_{error}$ is surpassed by the determined measurement error $\rho_{error}$. Advantageously, measurement can thus be cancelled when the threshold value of the measurement error $\rho_{error}$ is surpassed during an approximate measurement error determination, so that no further accurate measurement error determination will be conducted, which effectively reduces measuring time. In addition, a user can advantageously define an acceptable measurement error $\rho_{error}$ by setting an individual threshold value.

According to another preferred embodiment of the method for determining a measurement error, determination of the measurement error is conducted during adjustment of a measuring temperature of the liquid in the flexural resonator to a target temperature of the liquid in the flexural resonator set for the conduction of the measurement. This leads to the advantage that measurement error determination does not require any additional measuring time during measurement of the density of the liquid because it is conducted during temperature adjustment of the liquid to be measured that has to be made anyway. It is particularly advantageous if the temperature or temperatures of the liquid in the determination of the measurement error are stored during adjustment of the measuring temperature because the effect of the temperature on the density can be taken into account based on density parameters at different temperatures of the liquid so that accuracy can be improved.

A further preferred embodiment of the method for determining a measurement error provides that the target temperature of the liquid in the flexural resonator is between 10° C. and 90° C., preferably between 14° C. and 20° C., in particular between 15° C. and 16° C.

According to a further preferred embodiment of the method for determining a measurement error reference pressure density measurement at a reference pressure, in particular ambient pressure, is conducted before each density measurement, and a measure for variation of the reference pressure density determined at the reference pressure is determined, wherein measurement is cancelled when a threshold value of the variation of measurement is surpassed, and the determined densities are discarded. This thus leads to the advantage that it is determined whether density variations occur during measurement error determination, which are reflected in the reproducibility of density measurement at the reference value. Such density variations can, for example, be caused by a variation of an ambient parameter of measurement, in particular by temperature changes during temperature adjustment of the liquid to be measured. If variation of the measuring values is larger than predetermined by a measure for the variation, measurement is cancelled prematurely, which again reduces measuring time.

Another preferred embodiment of the method for determining a measurement error provides that the pressure used for determining the measurement error is between 100 kPa and 200 kPa, preferably between 101 kPa and 150 kPa.

Consequently, measurement error determination is preferably conducted in a pressure range between one and one and a half times the atmospheric pressure at sea level, which leads to optimal results for most liquids to be measured.

The present invention will now be described in more detail by means of exemplary embodiments with reference to the figures.

Figure 1:
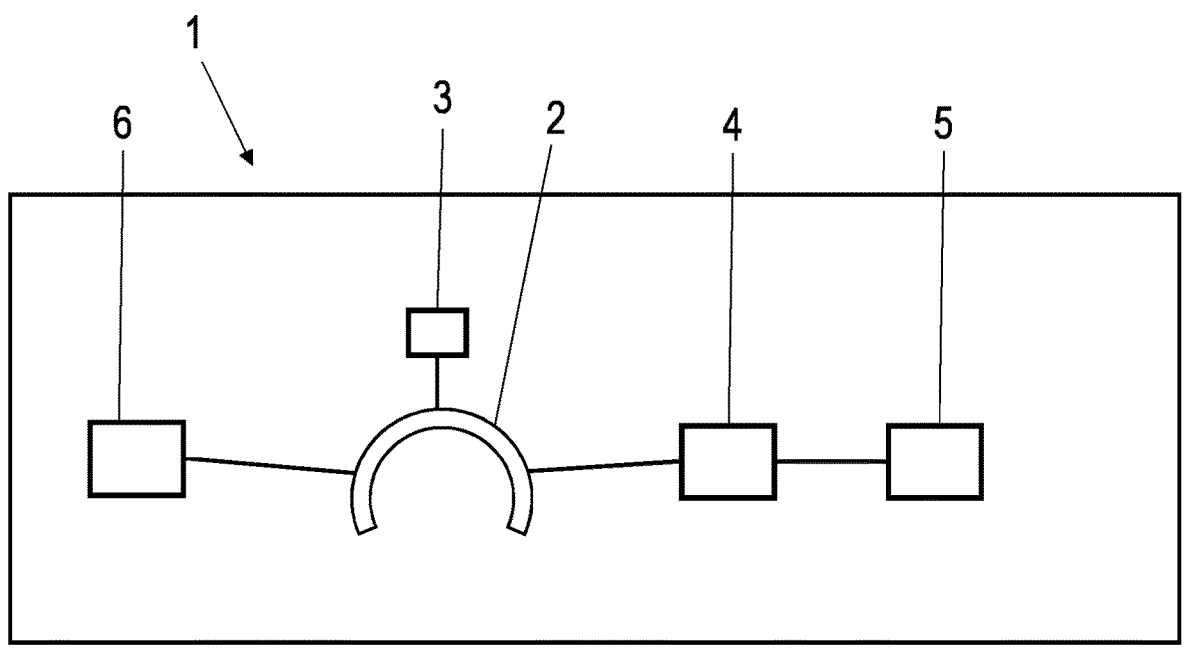
FIG. 1 shows a schematic representation of the essential components of a densimeter according to claim 1 for determining a measurement error caused by a filling error, in particular the presence of gas bubbles.

FIG. 1 shows the components of a densimeter 1. The densimeter 1 comprises a flexural resonator 2, which may be filled with the liquid to be measured and is connected to an induction unit 3, which is suitable to induce natural oscillations of the flexural resonator 2. The flexural resonator 2 is furthermore connected to a pressurization means 6, by means of which the liquid in the flexural resonator 2 can be pressurized. The measuring device 4 is connected to an evaluation unit 5, which is suited to convert the measured frequencies into corresponding density values of the liquid.

Figure 2:
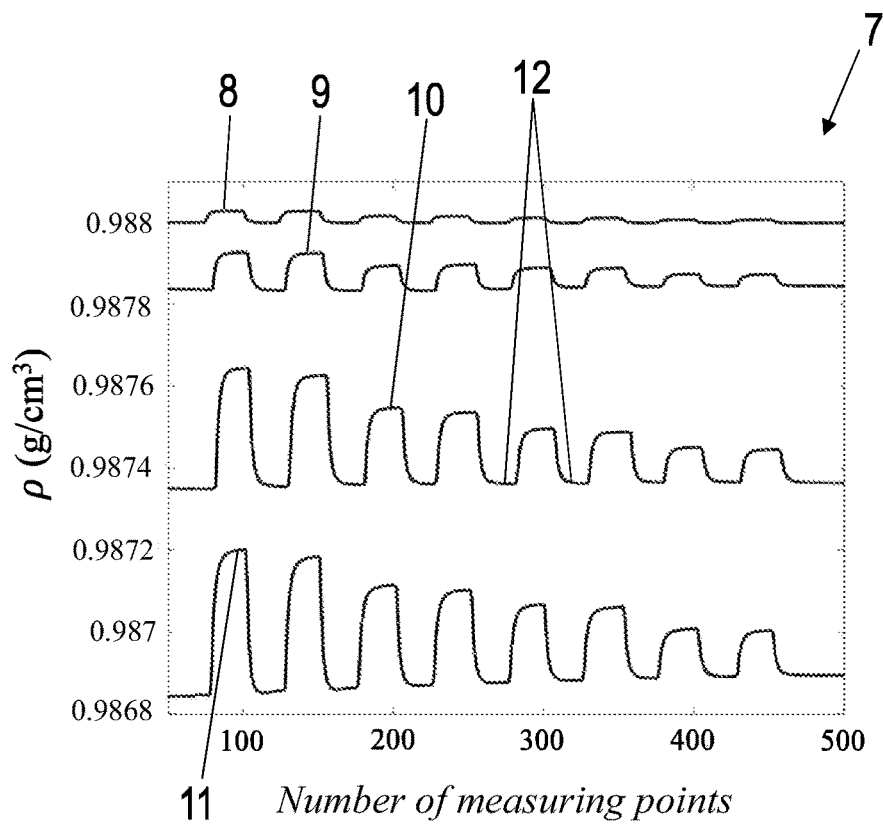
FIG. 2 shows a graph displaying the time course of density measurements of four samples of a first intransparent liquid, which were subjected to eight different pressures.

FIG. 2 shows, in a graph 7, a measuring example of an intransparent liquid in the form of a measurement series of the density $\rho$ for four samples of a lubricating oil that have filling errors of different magnitudes in the form of gas bubbles in various sizes and numbers and to which different pressures are applied.

A measurement series 8 does not have any observable gas bubbles and is de facto to be considered as free from filling errors. A measurement series 9 has a minor filling error in the form of several small bas bubbles, a measurement series 10 has a larger filling error than measurement series 9, and a measurement series 11 has a larger filling error in the form of several large gas bubbles.

In the measurement conducted in a preferred embodiment of the method, each sample is subjected to eight different pressures P before density measurement, wherein the largest pressure P is applied first, the subsequent pressures P are successively reduced, and the smallest pressure P is applied last. In addition, a reference pressure density measurement 12 is conducted at a reference pressure, which was set during measurement at atmospheric pressure shown in FIG. 2, before each density measurement with an applied pressure. As is to be expected for a compressible liquid, the measurement at the largest pressure has the highest density value, and the measurement at atmospheric pressure has the smallest density. In addition, FIG. 2 shows that variation of the reference pressure density measurements 12 for all measurement series 8 to 11 is very low, which is apparent from the good reproducibility of the reference pressure density measurements 12.

Figures 3A, 3B:
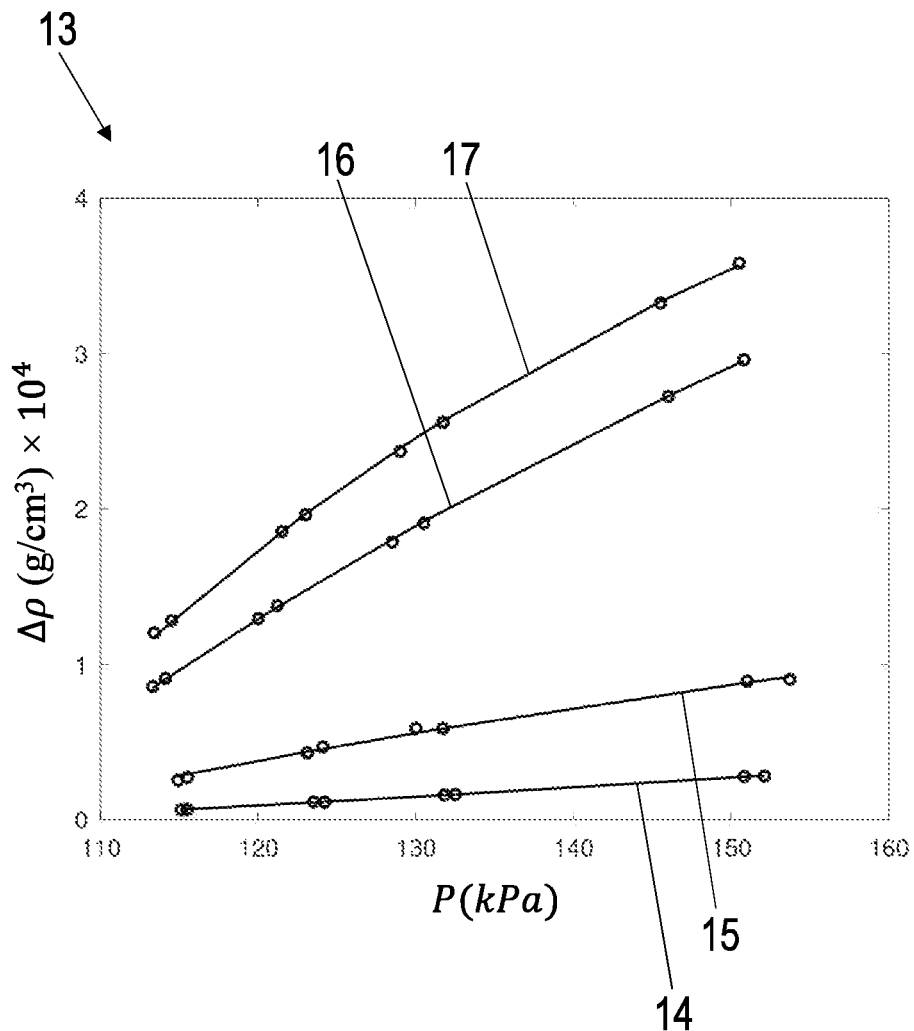
FIG. 3a shows a graph of the density differences determined from measurement of the first liquid as a function of the applied pressure.
FIG. 3b shows the measurement error $\rho_{error}$ determined from the density differences for all measurement series according to FIG. 3a in a table.

FIG. 3a shows, in a graph 13, the course of the pressure-dependent density differences $\Delta\rho(P)$ for the four samples of the lubricating oil from FIG. 2, which were determined from the reference pressure density measurement and the pressurized density measurements of the lubricating oil, as a function of the applied pressure. The curves determined by curve fittings of the individual measuring points according to the above equation show that a curve 14, which was generated from the measurement values of the quasi bubble-free measurement series 8, has the lowest slope and thus the lowest pressure-dependent change of density $\Delta\rho(P)$. A curve 17, on the other hand, which was generated from the measurement values of the measurement series 11 with the highest filling error, has the highest slope and the largest pressure-dependent change of density $\Delta\rho(P)$. In general, the degree of slope of a curve increases with the magnitude of the filling error, as is also shown by curves 15 and 16, which were determined from the measurement values of the measurement series 9 and 10.

FIG. 3b shows, in a table 18, the measurement error $\rho_{error}$ determined from the density differences of the respective measurement series 8, 9, 10, and 11, wherein the measurement series 8 has the smallest measurement error $\rho_{error}$ of 0.000021 g/cm³. At a customary threshold value of the measurement error $\rho_{error}$ of 0.0001 g/cm³, this would mean that, as is correct, no filling error is detected for the sample, but the determined quantitative measurement error can be used for a further evaluation of measurement data of this sample and is thus important for interpretation of the data.

In the measurement series 9, 10 and 11, on the other hand, a filling error caused by the presence of gas bubbles in the sample is correctly detected in quantitative filling error determination, so that no further time-consuming measurement of this sample is conducted hereafter and valuable measurement time can be saved. FIG. 3b also shows that, according to the quantitative nature of the method, the measurement error $\rho_{error}$ increases with an increasing filling error of the measured sample.

For an independent examination of the increase of the measurement error as a function of the magnitude of the filling error and thus the quantitative nature of the method, the density difference between one of the reference pressure density measurements 12 of the filling-error-free measurement series 8 and a respective one of the reference pressure measurements 12 of the filling-error-containing measurement series 9, 10, 11 may be used. The density difference between the reference pressure density measurement 12 of the filling-error-free measurement series 8 and the measurement series 9 showing a small filling error is $1.6\times10^{-4}$ g/cm³, the density difference between the reference pressure density measurement 12 of the measurement series 8 and the reference pressure density measurement 12 of measurement series 10 having a larger filling error than measurement series 9 is $6.4\times10^{-4}$ g/cm³. The density difference between the reference pressure density measurement 12 of the measurement series 8 and the measurement series 11 showing the largest filling error is $11.2\times10^{-4}$ g/cm³.

It is thus clearly visible from these determined density differences that the density difference between the reference pressure measurements 12 of the quasi filling-error-free measurement series and the reference pressure measurements 12 of the filling-error-containing measurement series 9, 10, 11 increases with an increasing filling error as a function of the magnitude of the filling error, which additionally underlines the quantitative nature of the method.

Figures 4A, 4B:
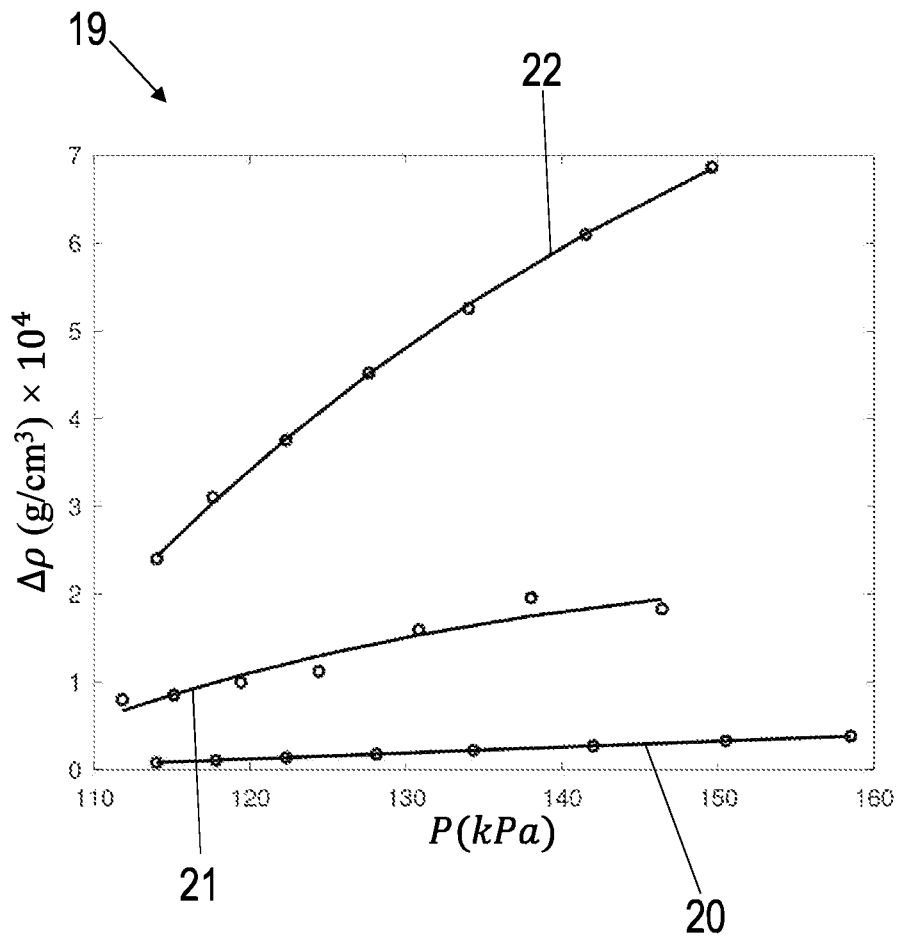
FIG. 4a shows a graph of the density differences determined from measurement of a second, transparent liquid as a function of the applied pressure.
FIG. 4b shows a measurement error $\rho_{error}$ determined from the density differences for all measurement series according to FIG. 4a in a table.

FIG. 4a shows, in a graph 19, an measurement example of a transparent liquid in the form of the course of the pressure-dependent density differences $\Delta\rho(P)$ for three samples of a base oil, which were determined from reference pressure density measurements and pressurized density measurements of a base oil, as a function of the applied pressure. This also shows, based on the curves determined via curve fittings of the respective measurement points, that a curve 20, which was generated from the measurement values of a quasi filling-error-free sample, has the lowest slope and thus the lowest pressure-dependent change of density $\Delta\rho(P)$. A curve 22, which was generated from the measurement value of the sample with the largest filling error, again has the highest slope as well as the largest pressure-dependent change of density $\Delta\rho(P)$, and a curve 21 lies between curves 20 and 22.

FIG. 4b shows, in a table 23, the measurement error $\rho_{error}$ determined from the density differences of the respective measurement series or curves, wherein the measurement series of curve 20 has the smallest measurement error $\rho_{error}$, which is why, contrary to the measurement series of the curves 21 and 22, good filling of the flexural resonator 2 with base oil and thus no filling error are detected. It is to be noted that the measurement series of curve 21 and optionally 22 may of course be recognized as sufficient, which depends on the predetermined acceptable threshold value of the measurement error $\rho_{error}$.

The density determination method described herein is not limited to the indicated formula and may also be applied by using a similar mathematical model, e.g. by supplementing the model used herein for describing the ideal gas with a correction term for an approximation to the behavior of a real gas or with a correction term for the compressibility of the flexural resonator a high pressures or with any other similar modification.

The invention claimed is:

1. A method for determining a measurement error ($\rho_{error}$) caused by a filling error during measurement of a density($\rho$) of a liquid by means of a densimeter having a flexural resonator containing the liquid to be measured, wherein, during a measuring operation, a period duration of an oscillation of the flexural resonator induced by an induction unit is measured by a measuring device and the density ($\rho$) of the liquid is determined by an evaluation unit, the method comprising:
  determining a first pressure-dependent density difference ($\Delta\rho(P)$) by subtracting the determined density ($\rho$) of the liquid pressurized with a first pressure ($P_0$) by a pressurizing means during a first measuring operation and of the liquid pressurized with a second pressure ($P$) by means of the pressurizing means during a second measuring operation; and
  determining the measurement error ($\rho_{error}$) via the equation $$\Delta\rho(P) = (P - P_0) \cdot \left( \frac{\rho_{error}}{P} + \frac{1}{E} \right),$$

wherein for solving the equation, either a compressibility (E) depending on the measured liquid is selected or at least one further density difference ($\Delta\rho(P)$) is determined by subtracting the determined density ($\rho$) of the liquid pressurized with the first pressure ($P_0$) by the pressurizing means during the first measuring operation and of the liquid pressurized with at least a further pressure ($P$) by the pressurizing means during at least one second measuring operation.

2. The method for determining a measurement error ($\rho_{error}$) according to claim 1, further comprising detecting the filling error when a predetermined threshold value of the measurement error ($\rho_{error}$) is surpassed by the determined measurement error ($\rho_{error}$).

3. The method for determining a measurement error ($\rho_{error}$) according to claim 1, wherein the pressure used for determining the measurement error ($\rho_{error}$) is between 100 kPa and 200 kPa, or between 101 kPa and 150 kPa.

4. The method of claim 1, wherein the filling error includes a presence of gas bubbles.

5. The method for determining a measurement error ($\rho_{error}$) according to claim 1, wherein the determination of the measurement error ($\rho_{error}$) is conducted during adjustment of a measuring temperature of the liquid in the flexural resonator to a target temperature of the liquid in the flexural resonator set for the conduction of the measurement.

6. The method for determining a measurement error ($\rho_{error}$) according to claim 5, wherein the target temperature of the liquid in the flexural resonator is between 10° C. and 90° C., or between 14° C. and 20° C., or between 15° C. and 16° C.

7. The method for determining a measurement error ($\rho_{error}$) according to claim 1, wherein a measurement of a reference pressure density at a reference pressure is conducted before each density measurement, and a measure for variation of the reference pressure density determined at the reference pressure is determined, wherein measurement is cancelled when a threshold value of the variation of measurement is surpassed, and the determined densities are discarded.

8. The method of claim 7, wherein the reference pressure is ambient pressure.

* * * * *